United States Patent
Yang et al.

(10) Patent No.: US 11,030,289 B2
(45) Date of Patent: Jun. 8, 2021

(54) HUMAN PRESENCE DETECTION

(71) Applicant: STMicroelectronics, Inc., Coppell, TX (US)

(72) Inventors: Xiaoyong Yang, San Jose, CA (US); Sankalp Dayal, Fremont, CA (US)

(73) Assignee: STMicroelectronics, Inc., Coppell, TX (US)

( * ) Notice: Subject to any disclaimer, the term of this patent is extended or adjusted under 35 U.S.C. 154(b) by 357 days.

(21) Appl. No.: 16/050,628

(22) Filed: Jul. 31, 2018

(65) Prior Publication Data
US 2019/0034609 A1 Jan. 31, 2019

Related U.S. Application Data

(60) Provisional application No. 62/539,278, filed on Jul. 31, 2017.

(51) Int. Cl.
| | |
|---|---|
| *G06F 21/32* | (2013.01) |
| *G01C 3/08* | (2006.01) |
| *G01C 19/58* | (2006.01) |
| *G10L 17/00* | (2013.01) |
| *G01P 15/16* | (2013.01) |
| *G06F 21/31* | (2013.01) |

(52) U.S. Cl.
CPC .............. *G06F 21/32* (2013.01); *G01C 3/08* (2013.01); *G01C 19/58* (2013.01); *G01P 15/165* (2013.01); *G06F 21/316* (2013.01); *G10L 17/00* (2013.01); *G06F 2221/2139* (2013.01)

(58) Field of Classification Search
CPC ......... G06F 21/32; G06F 21/316; G01C 3/08; G01C 19/58; G01P 15/165; G01P 15/16; G10L 17/00; G10L 17/005

USPC .......................................................... 713/186
See application file for complete search history.

(56) References Cited

U.S. PATENT DOCUMENTS

| | | | | |
|---|---|---|---|---|
| 7,126,816 B2* | 10/2006 | Krah | ..................... | G06F 1/1616 361/679.55 |
| 7,707,436 B2* | 4/2010 | Tsukamoto | ........... | G06F 1/1677 713/300 |
| 9,430,629 B1* | 8/2016 | Ziraknejad | ............ | G06F 16/583 |
| 9,558,762 B1* | 1/2017 | Sieracki | .................. | G10L 17/00 |
| 9,706,406 B1* | 7/2017 | Adams | .............. | H04W 12/0605 |
| 9,984,690 B1* | 5/2018 | Shintani | .................. | G10L 15/08 |
| 10,452,116 B1* | 10/2019 | Devries | ................. | G01P 15/097 |
| 2003/0040346 A1* | 2/2003 | Fukuda | ................. | G06F 3/0317 455/575.1 |

(Continued)

OTHER PUBLICATIONS

Zhang et al., "Resource Configurable Spoken Query Detection Using Deep Boltzmann Machines," 2012 IEEE International Conference on Acoustics, Speech and Signal Processing, Kyoto, Japan, Mar. 25-30, 2012, pp. 5161-5164.

*Primary Examiner* — Farid Homayounmehr
*Assistant Examiner* — Thanh T Le
(74) *Attorney, Agent, or Firm* — Seed Intellectual Property Law Group LLP (57) ABSTRACT

A method includes sensing through time-of-flight measurements a distance of an object from an electronic device, sensing motion of the electronic device, sensing acoustic signals received by the electronic device, and detecting the presence of a human proximate the electronic device based on the sensed distance, motion and acoustic signals. Access to the electronic device is controlled based on whether a human is detected as being present.

20 Claims, 9 Drawing Sheets

(56) References Cited

U.S. PATENT DOCUMENTS

| | | | |
|---|---|---|---|
| 2008/0059004 A1* | 3/2008 | Katoh | G05D 23/1919 700/300 |
| 2010/0027378 A1* | 2/2010 | Sabatier | G08B 13/1672 367/136 |
| 2011/0010093 A1* | 1/2011 | Partridge | G01S 5/0252 701/300 |
| 2011/0296163 A1* | 12/2011 | Abernethy | G06F 1/3203 713/100 |
| 2012/0235578 A1* | 9/2012 | Miller | H05B 47/16 315/152 |
| 2012/0235790 A1* | 9/2012 | Zhao | G06K 9/00228 340/5.83 |
| 2012/0287035 A1* | 11/2012 | Valko | G06F 1/3231 345/156 |
| 2013/0091537 A1* | 4/2013 | Parla | H04L 63/10 726/1 |
| 2013/0347058 A1* | 12/2013 | Smith | G06F 21/57 726/1 |
| 2014/0123273 A1* | 5/2014 | Matus | H04L 63/101 726/17 |
| 2014/0230057 A1* | 8/2014 | Berger | G06F 21/554 726/23 |
| 2014/0247695 A1* | 9/2014 | Vangeel | G01S 15/04 367/93 |
| 2014/0300581 A1* | 10/2014 | Aurongzeb | A61L 2/10 345/175 |
| 2015/0135270 A1* | 5/2015 | Robison | G06F 21/81 726/4 |
| 2015/0278531 A1* | 10/2015 | Smith | H04L 9/30 713/165 |
| 2015/0288688 A1* | 10/2015 | Derakhshani | G06K 9/00771 726/19 |
| 2015/0347732 A1* | 12/2015 | Alameh | G06F 21/32 726/19 |
| 2016/0116960 A1* | 4/2016 | Kwak | G06F 1/3206 713/323 |
| 2016/0252542 A1 | 9/2016 | Chowdhary et al. | |
| 2016/0253594 A1 | 9/2016 | Chowdhary et al. | |
| 2016/0255017 A1 | 9/2016 | Chowdhary et al. | |
| 2017/0097413 A1* | 4/2017 | Gillian | H04W 4/80 |
| 2017/0235355 A1* | 8/2017 | Alshinnawi | G06F 1/3278 713/323 |
| 2017/0257770 A1* | 9/2017 | Derakhshani | G06K 9/52 |
| 2018/0107833 A1* | 4/2018 | Gadepalli | G06F 21/32 |
| 2018/0144569 A1* | 5/2018 | Einberg | H04W 4/027 |
| 2018/0150062 A1* | 5/2018 | Shapiro | G05B 19/4093 |
| 2018/0181741 A1* | 6/2018 | Whaley | H04W 4/38 |
| 2020/0142471 A1* | 5/2020 | Azam | G06F 1/3231 |

\* cited by examiner

SYSTEM STATE (SS)

| State Name | Function | Values |
|---|---|---|
| Lid Vertical (LV) | If lid is vertical or not, that is if ToF sensor is facing front and has clean line of sight view | YES/NO |
| Resting Position (RP) | Electronic Device resting on Lap or on Desk or Moving | LAP/DESK/MOVING |
| Moved (M) | Has Electronic Device moved since last detection of human presence? | YES/NO |
| Vibration Sufficient (VS) | Was vibration sufficient when last time human presence was detected? | YES/NO |

HUMAN PRESENCE DETECTION

BACKGROUND

Technical Field

The present disclosure relates generally to detecting the presence of a user proximate an electronic device and, more specifically, to detecting the presence of a user and controlling access to the electronic device based on this detection.

Description of the Related Art

Current mobile electronic devices such as laptop computers, tablet computers and smart phones are portable and are regularly utilized in a variety of different environments or settings, such as in the privacy of a home, at a work office or in workshare type locations, and in public environments like coffee shops or restaurants. Security concerns of such mobile electronic devices arise in these different environments. In addition, privacy concerns may arise in public settings in relation to the content that a user of the mobile electronic device is viewing. Access to the mobile electronic device should be provided only when a user of the device is present proximate the device as is the case when the user is actively utilizing the device. Where the device is a laptop computer, for example, and is in a public setting like a coffee shop, if the user steps away from the computer without logging out, someone could gain access to the device while the user is away. Moreover, in a public setting someone positioned behind the user could view content the user is displaying on the device.

There is a need for improving the detection of a user or other person proximate an electronic device and controlling access to the electronic device based on this detection.

BRIEF SUMMARY

In one embodiment of the present disclosure, an electronic device includes a time-of-flight sensor that in operation generates a distance signal indicating a distance of an object from the electronic device. A motion sensor generates a motion signal indicating motion of the electronic device and an audio sensor that generates a sensed audio signal in response to acoustic signals received by the electronic device. A processor is coupled to the time-of-flight, motion and audio sensors and processes the distance, motion, and sensed audio signals and controls access to the electronic device based on the processed distance, motion and sensed audio signals.

In another embodiment, a method includes sensing through time-of-flight measurements a distance of an object from an electronic device, sensing motion of the electronic device, sensing audio signals received by the electronic device, and detecting the presence of a human proximate the electronic device based on the sensed distance, motion and audio signals. In an embodiment the method further includes controlling access to the electronic device based on whether a human is detected as being present proximate the electronic device.

The present disclosure is directed to a computing system that includes a plurality of sensors that detects the presence of a user and determines if the user intends to engage with the computing system and is authorized to access the computing system. For example, the system will have a plurality of parameters such that if some subset of the parameters is met the computing system will unlock and grant access to the user.

The plurality of sensors can include a time of flight sensor to detect the presence of the user within a field of view of the time of flight sensor. The field of view will correspond to a threshold distance of the computing system that defines an accepted area of use for the user. If the user is in the area, a first parameter is met.

The plurality of sensors can also include a vibration sensor, an orientation sensor, and a sound intensity sensor. Each of the sensors can be associated with a parameter. For example, if the time of flight sensor detects the presence of the user and the first parameter is met and a second parameter from one of the other sensors, such as the vibration sensor indicating the computing system being positioned on a lap, then the computing system may be activated to unlock a screen or be automatically unlocked.

BRIEF DESCRIPTION OF THE SEVERAL VIEWS OF THE DRAWINGS

The foregoing and other features and advantages will become apparent from the following detailed description of embodiments, given by way of illustration and not limitation with reference to the accompanying drawings, in which.

DETAILED DESCRIPTION

Figure 1:
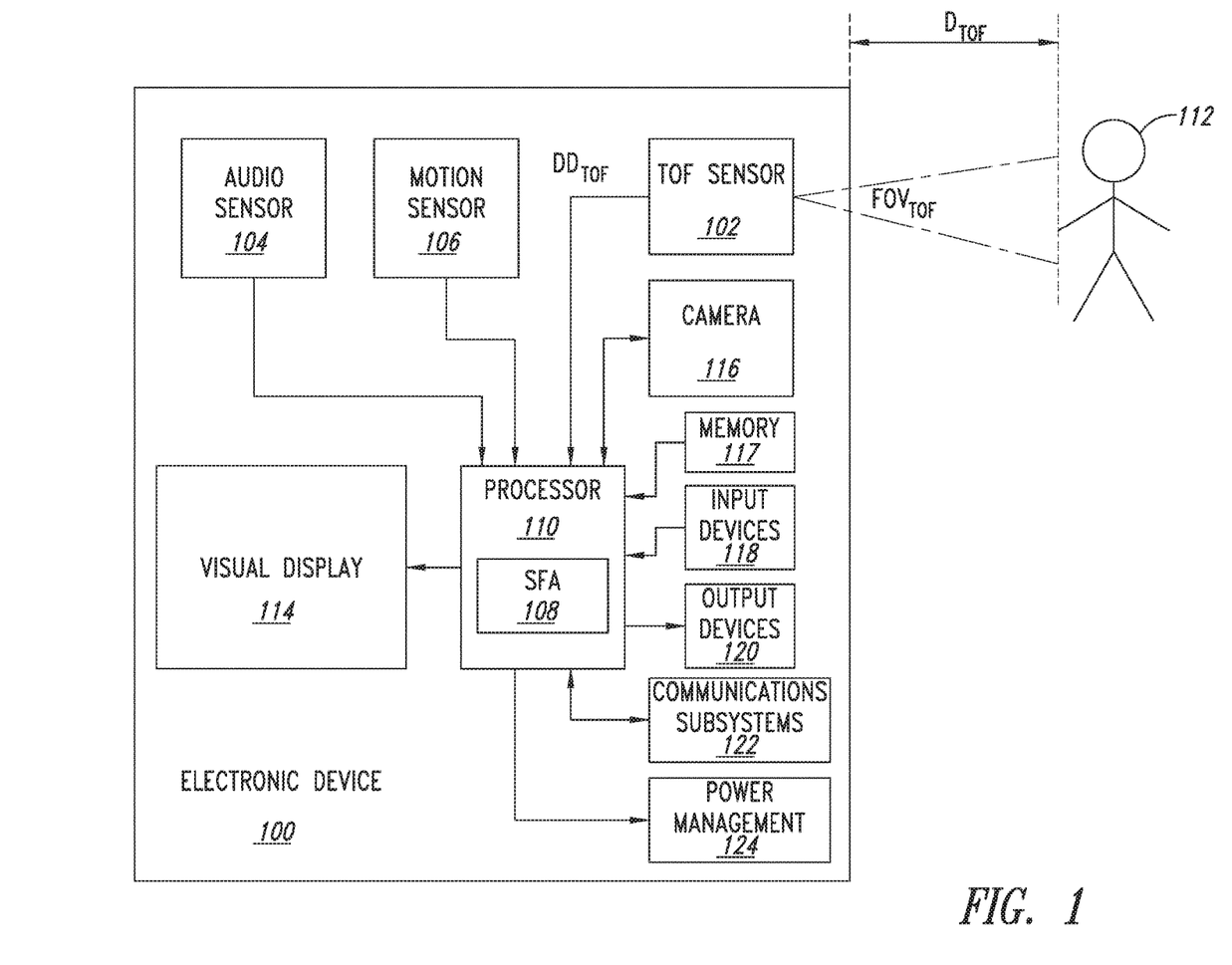
FIG. 1 is a functional block diagram of an electronic device including a time-of-flight (TOF) sensor, audio sensor, and motion sensor that are used in combination to detect the presence of user proximate the electronic device according to one embodiment of the present disclosure.

FIG. 1 is a functional block diagram of an electronic device 100 including a time-of-flight (TOF) sensor 102, audio sensor 104 and motion sensor 106 that generate respective signals that are processed by a sensor fusion algorithm (SFA) 108 executing on a processor 110 to detect the presence of a user 112 proximate the electronic device, as will be described in more detail below. The processor 110 then controls the operation of the electronic device 100 based upon whether the user 112 has been detected. In one embodiment, if no user 112 is detected the processor 110 places the electronic device 100 in a low-power mode of operation. During this low-power mode of operation, the processor 110 continues to execute the sensor fusion algorithm 108 to process signals generated by the TOF sensor 102, audio sensor 104 and motion sensor 106 and thereby detects when a user is again present proximate the electronic device 100.

Upon detecting the user 112, the processor 110 places the electronic device 100 in an active mode of operation and controls the device to enable the detected user 112 to again access the electronic device. For example, upon detecting the user 112 the processor 110 activates the device 100 and presents a login screen on a visual display 114 to allow the user to input a password to gain access to the device. Alternatively, upon detecting the user 112 the processor 110 may control components in the electronic device 110 such as a camera 116 to perform facial recognition or iris or retinal scanning on the user, and to then provide the user access to the electronic device once the user has been authenticated. In some embodiments, the processor 110 also processes the signals generated by the TOF sensor 102, audio sensor 104 and motion sensor 106 to distinguish between situations where someone is approaching the electronic device 100 with an intent to use the device and someone whom is merely passing by the device, such as would commonly occur in public settings such as a coffee shop.

In the present description, certain details are set forth in conjunction with the described embodiments to provide a sufficient understanding of the present disclosure. One skilled in the art will appreciate, however, that the subject matter of the present disclosure may be practiced without these particular details. Furthermore, one skilled in the art will appreciate that the example embodiments described below do not limit the scope of the present disclosure to the disclosed embodiments, and will also understand that various modifications, equivalents, and combinations of the disclosed embodiments and components of such embodiments are within the scope of the present disclosure. Embodiments including fewer than all the components of any of the respective described embodiments may also be within the scope of the present disclosure although not expressly described in detail below. Finally, the operation of well-known components and/or processes have not been shown or described in detail below to avoid unnecessarily obscuring the present disclosure.

In operation of the electronic device 100, the TOF sensor 102 transmits an optical pulse signal and then detects a time between transmission of this optical pulse signal and receipt of a return optical pulse signal corresponding to a portion of the transmitted optical pulse signal reflected off the human or user 112. The TOF sensor 102 detects a distance $D_{TOF}$ between the electronic device 100 and the user 112 based upon the time between this transmission and receipt of optical pulse signals. The TOF sensor 102 generates a detected distance signal $DD_{TOF}$ indicating the detected distance $D_{TOF}$ and this detected distance signal is provided to the processor 110. This detected distance $D_{TOF}$ can be processed over time to detect an object present within a given range from the electronic device 100. To simplify the present description the processor 110 and sensor fusion algorithm 108 will be described as processing the detected distance $D_{TOF}$ even though these components technically process the detected distance signal $DD_{TOF}$ which indicates this detected distance. In addition, the detected distance $D_{TOF}$ can be processed to determine whether the detected object is moving relative to the electronic device and may also be processed to determine whether the detected object is a human or user 112, or is an inanimate object such as a wall, piece of glass, or a chair.

The audio sensor 104 may be any suitable type of audio transducer for sensing audible or acoustic sounds in the vicinity of or proximate the electronic device 100. The audio sensor 104 is accordingly utilized to sense human or user-related sounds proximate the electronic device 100, such as human walking and talking. More specifically, these user-related sounds proximate the electronic device result in corresponding sound waves being incident or impinging on the electronic device, with the audio sensor 104 sensing these sound waves. This sensing will be referred to as sensing or detecting sounds proximate the electronic device 100 in the present description. In one embodiment, the audio sensor 104 is a suitable microphone such as a microelectromechanical system (MEMS) microphone.

The motion sensor 106 similarly may be any suitable type of motion sensor capable of sensing movement and orientation of the electronic device 100. In one embodiment, the motion sensor 106 includes an accelerometer for sensing vibrations and movement of the electronic device 100 due to the presence of a user 112. In this embodiment the motion sensor 106 also includes a gyroscope for sensing an orientation of the electronic device. Where the electronic device 100 is a laptop computer, the motion sensor 106 also senses an orientation of a lid of the laptop computer, which will be utilized by the processor 110 in determining whether the TOF sensor 102 may be reliably utilized in detecting the presence of a user 112, as will be described in more detail below.

Each of the TOF sensor 102, audio sensor 104 and motion sensor 106 has strengths and weaknesses in sensing or detecting the presence of a human, namely a user 112 proximate the electronic device 100. Ideally, a sensor would be able to detect or sense several characteristics of an object proximate the electronic device 100 including whether the object is a human or an inanimate object, whether the object is approaching the electronic device, and whether the object is approaching the electronic device with an intent to interact with the electronic device or is merely passing by proximate the electronic device.

Embodiments of the present disclosure utilize the signals generated by multiple types of sensors, namely the TOF sensor 102, audio sensor 104 and motion sensor 106 in the embodiment of FIG. 1, to overcome the weaknesses of the individual sensors in sensing a human or user 112 proximate the electronic device 100. This utilization of signals from different types of sensors may be considered a combination or "fusion" of different types of sensor signals, and thus the algorithm that processes these multiple sensor signals is referred to as the sensor fusion algorithm 108 as previously mentioned, and as will be described in more detail below.

For the TOF sensor 102, the user 112 must be positioned within a field of view $FOV_{TOF}$ of the TOF sensor for the sensor to properly illuminate the person with the transmitted optical pulse signals and sense the corresponding returned optical pulse signals reflected off the user, as will be appreciated by those skilled in the art. In addition, utilization of the TOF sensor 102 in sensing objects present in high ambient light level conditions, such as in sunlight, is typically difficult. The same is true for sensing low reflectivity objects such as where the user 112 may be wearing dark clothing. The range of the TOF sensor 102, meaning the maximum distance $D_{TOF}$ at which an object or user 112 can be reliably detected, is also typically relatively small so only when the user is relatively close to the electronic device 100 can the user be reliably detected with the TOF sensor.

As mentioned above, the audio sensor 104 senses audible sounds proximate the electronic device 100. The audio sensor 104 is relatively good or effective at sensing the presence of a user 112 proximate the electronic device 100 in many settings, and can also provide a good indication of whether such a user is approaching the electronic device. The audio sensor 104 is not, however, able to provide a good indication of whether a user near the electronic device 100 is approaching the device with intent to interact with the device.

The motion sensor 106 senses vibrations related a user 112 proximate the device, but the reliability of the motion sensor to sense vibrations resulting from the presence of the user varies widely depending on the environment in which the electronic device 100 is present. For example, where the electronic device is present in a carpeted room the ability of motion sensor 106 to sense vibrations associated with a user 112 walking towards the device may be greatly reduced, whereas such vibrations may be reliably sensed when in a room with hard floor surface such as wood or tile. The motion sensor 106 can easily detect that a user has picked up the electronic device 100, such as where the device is a laptop or hand held computing system. The motion sensor 106 can determine and differentiate between a user walking with the computing system across a room or placing the computing system on their lap. There are subtle movements that are detected by the motion sensor 106 that detect that the user has the electronic device 100 positioned on their lap.

Before describing the operation of the sensor fusion algorithm 108 in more detail, the remaining components in the electronic device 100 of FIG. 1 will first each be briefly described. The electronic device 100 further includes data storage or memory 117 coupled to the processor 110 for storing and retrieving data including apps and other software like the SFA 108 executing on the processor. Examples of typical types of memory 117 include solid state memory such as DRAM, SRAM and FLASH, solid state drives (SSDs), and could also include any other types of memory suited to the desired functionality of the electronic device 100 including phase-change memory (PCM), digital video disks (DVDs), compact disk read-only (CD-ROMs), compact disk read-write (CD-RW) memories, magnetic tape, hard and floppy magnetic disks, tape cassettes, and so on. Input devices 118 are coupled to the processor 110 and may include a keypad, whether implemented through the visual display 114 where the display is a touch screen or separately, a pressure sensor, accelerometer, microphone, keyboard, mouse, and other suitable input devices. Output devices 120 are also coupled to the processor 110 and may include, for example, audio output devices such as a speaker, printers, vibration devices, and so on. The input devices 118 and output devices 120 collectively may include other types of typical communications ports for the electronic device 100, such as USB ports, HDMI ports, and so on. The electronic device 100 further includes communications subsystems 122 coupled to the processor 110 and which may include Wi-Fi, GPS, cellular and Bluetooth® subsystems for providing the device with the corresponding communications functionality. The specific type and number of input devices 118, output devices 120, and communications subsystems 122 will of course depend on the specific type of the electronic device 100.

In FIG. 1, a power management subsystem 124 of the electronic device 100 is coupled to the processor 110, and would typically include a battery for powering the electronic device and also include control circuitry for controlling power-related operating modes of the device such as charging of the battery, power-savings modes to extend battery life, and so on. The visual display 114 may be any suitable type of display such as a liquid crystal display (LCD) or a touch screen including a suitable touch visual display and a touch panel (not shown) attached to or formed as an integral part of the touch visual display. In operation, where the visual display 114 is a touch screen, the touch screen senses touches of a user of the electronic device 100 and provides sensed touch information to the processor 110 to thereby allow the user to interface with and control the operation of the electronic device. The processor 110 also controls the touch screen 114 to display visual content on the touch visual display portion of the touch screen.

Figure 2A:
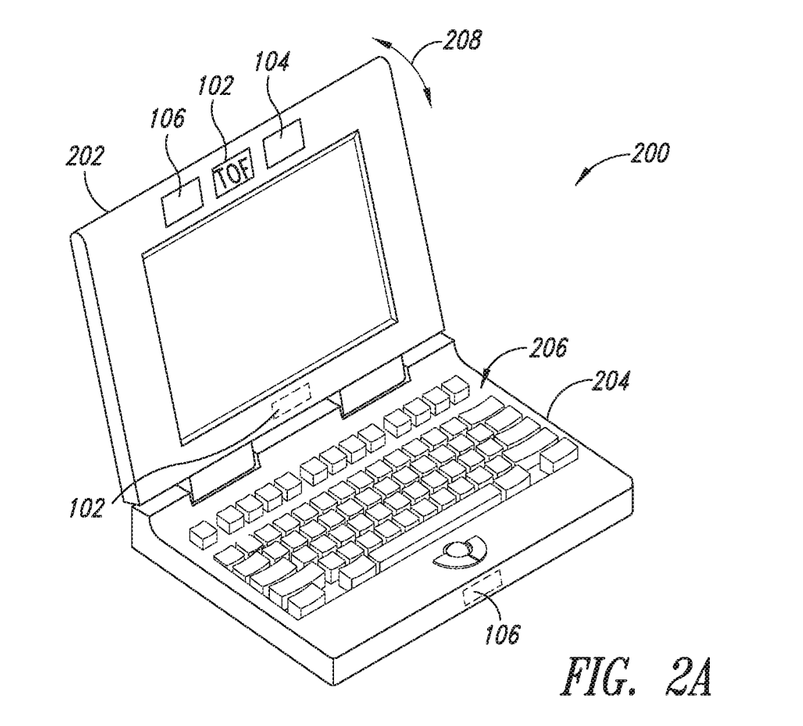
FIG. 2A is a perspective view of a laptop computer embodiment of the electronic device of FIG. 1 showing possible physical locations for the TOF, audio, and motion sensors.

The electronic device 100 may be any type of electronic device, such as a smart phone, a tablet computer, a laptop computer, or other type of mobile electronic device, and may also be a non-mobile type of device such as a desktop computer. In the embodiments of FIGS. 2-9 described below, the electronic device 100 is a laptop computer by way of example. FIG. 2A is a perspective view of a laptop computer 200 corresponding to one embodiment of the electronic device 100 of FIG. 1 and showing possible physical locations for the TOF sensor 102, audio sensor 104, and motion sensor 106 in the laptop computer. The laptop computer 200 includes the TOF sensor 102 of FIG. 1 contained within a lid 202 of the laptop computer in this embodiment. The TOF sensor 102 is shown positioned at the top of the lid 202 but may alternatively be positioned at the bottom of the lid, as illustrated by the dashed line box in the figure.

Figure 2B:
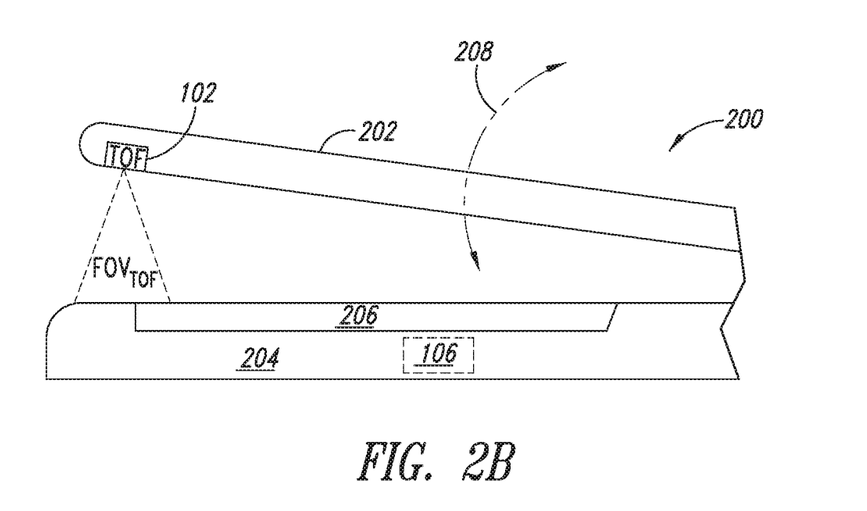
FIG. 2B is a partial cross-sectional view of the laptop computer of FIG. 2A showing the lid of the laptop computer nearly closed.

The motion sensor 106 is also positioned at the top of the lid 202, but may alternatively be positioned in a base 204 of the laptop computer 200 as represented by the dashed line in the figure. In one embodiment, the motion sensor is positioned underneath a keyboard 206 of the laptop computer 200. The audio sensor 104 may be positioned anywhere on the laptop computer 200 and is shown positioned at the top of the lid 202 along with the TOF sensor 102 and motion sensor 106 in the embodiment of FIG. 2A. FIG. 2B is a partial cross-sectional view of the laptop computer 200 of FIG. 2A showing the lid 202 of the laptop computer nearly closed. Only the TOF sensor 102 is shown positioned at the top of the lid 202 in FIG. 2B even though the audio sensor 104 and motion sensor 106 are also positioned at the top of lid as shown in FIG. 2A. The alternative location of the motion sensor 106 within the base 204 positioned underneath the keyboard 206 is also illustrated in FIG. 2B.

When the lid 202 of the laptop computer 200 is nearly closed as shown in FIG. 2B, the field-of-view $FOV_{TOF}$ of the TOF sensor 102 is directed downward towards the base 204 instead of outward towards a user of the laptop computer. As a result, the TOF sensor 102 may not be utilized in detecting the presence of a user proximate the laptop computer 200 when the lid 202 is closed or even partially closed. The motion sensor 106 senses the angular position of the lid 202 as represented by the arrow 208 in FIGS. 2A and 2B, and this information is utilized by the sensor fusion algorithm 108 in processing the signals from the sensors 102-106 to detect a user proximate the laptop computer 200, as will be described in more detail with reference to FIGS. 3-9.

Figure 3:
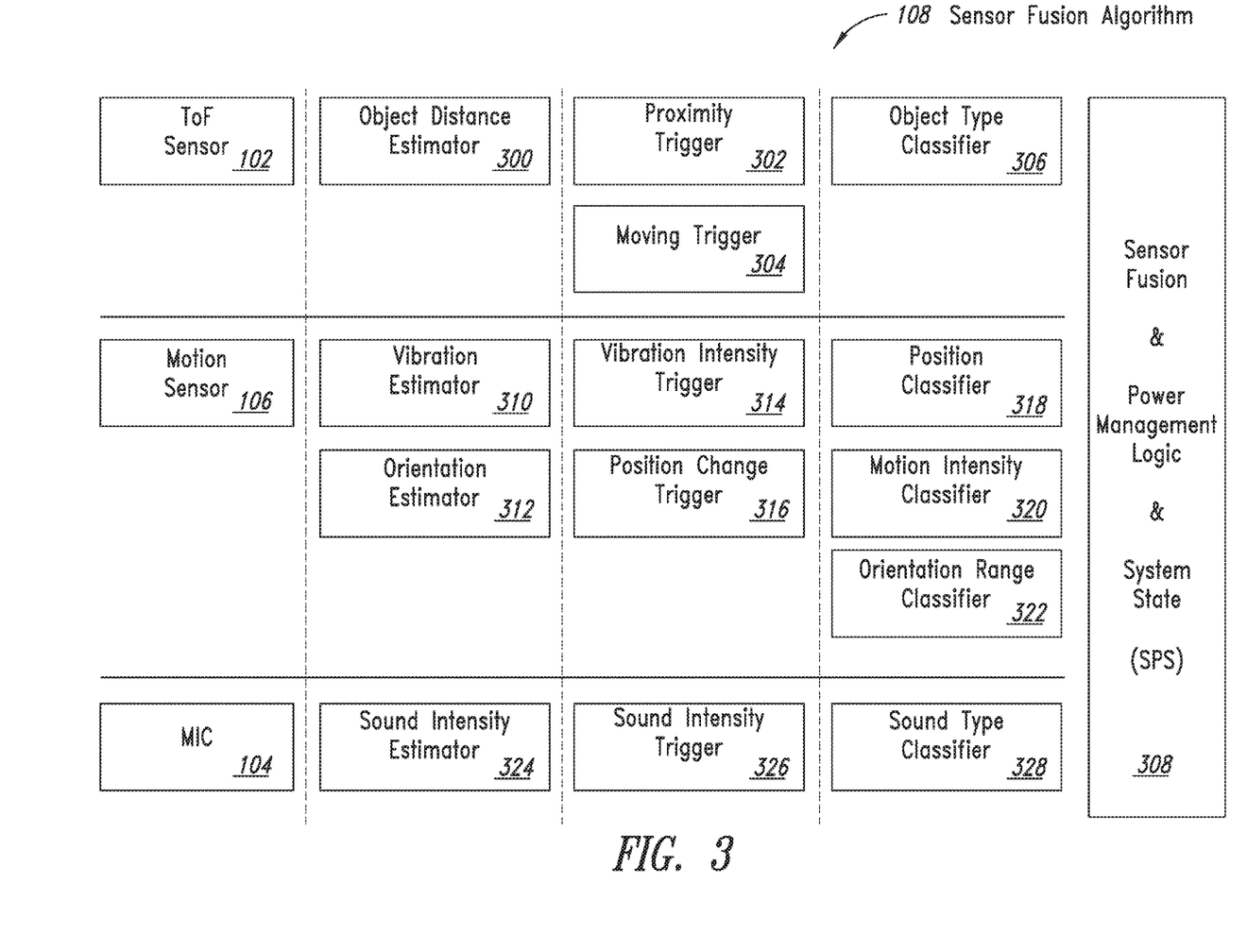
FIG. 3 is a functional diagram illustrating components of the sensor fusion algorithm of FIG. 1 according to one embodiment of the present disclosure.

FIG. 3 is a functional diagram illustrating components of the sensor fusion algorithm 108 of FIG. 1 according to one embodiment of the present disclosure. The figure shows these various components or modules of the sensor fusion algorithm that are associated with the processing of the signals generated by the TOF sensor 102, motion sensor 106, and microphone 104, which are illustrated in the left column of FIG. 3. The components or modules of the sensor fusion algorithm 108 may implemented in software, hardware, firmware, or a combination thereof. Accordingly, embodiments of the present disclosure may include these components or modules implemented, in whole or in part, in one or more Application Specific Integrated Circuits (ASICs), in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof.

As seen in FIG. 3, the sensor fusion algorithm 108 includes an object distance estimator module 300 that receives the detected distance $D_{TOF}$ from the TOF sensor 102 and processes the detected distance over time to estimate the distance to an object proximate the electronic device 100. A proximity trigger module 302 determines whether the estimated distance of the object from the electronic device 100 is less than a trigger threshold. A moving trigger module 304 determines whether a detected object in the field of view $FOV_{TOF}$ of the TOF sensor 102 is moving relative to the electronic device 100.

When either the proximity trigger module 302 or the moving trigger module 304 detects the corresponding condition or trigger, an object type classifier module 306 then begins processing the detected distance $D_{TOF}$ being sensed by the TOF sensor 102 to classify the type of object that is being sensed by the TOF sensor. The object type classifier module 306 determines whether a detected object is a human, such as the user 112 discussed with reference to FIG. 1, or is an inanimate object within the field of view $FOV_{TOF}$ of the TOF sensor 102. A sensor fusion, power management logic, and system state (SPS) module 308 of the sensor fusion algorithm 108 then utilizes the type of object detected by the object type classifier module 306 in determining whether a user is present proximate the electronic device 100, as will be described in more detail below.

In relation to the signals generated by the motion sensor 106, the sensor fusion algorithm 108 includes a vibration estimator module 310 that processes signals sensed by the motion sensor to generate estimated vibrations experienced by the electronic device 100. An orientation estimator module 312 provides an estimated orientation of the electronic device 100 from the signals generated by the motion sensor 106. A vibration intensity trigger module 314 then processes the estimated vibration provided by the vibration estimator module 310 to determine whether the estimated vibration has reached a vibration trigger threshold. A position change trigger module 316 similarly processes the estimated orientation provided by the orientation estimator module 312 to determine whether the position or orientation of the electronic device 100 has changed by more than a position change trigger threshold.

When either the vibration intensity trigger module 314 determines the estimated vibration has reached the vibration trigger threshold or the position change trigger module 316 determines the position of the electronic device 100 has changed by at least the position change trigger threshold, several classification modules further process the signals generated by the motion sensor 106 to determine whether these signals indicate the presence of a human proximate the electronic device 100. More specifically, a position classifier module 318 determines whether the electronic device 100, which is assumed to be the laptop computer 200 of FIGS. 2A and 2B in the embodiment of the sensor fusion algorithm 108 being described with reference to FIG. 3, is positioned on the lap of a user 112 (FIG. 1) or is positioned on a desk or other stationary surface. A motion intensity classifier module 320 then processes the signals generated by the motion sensor 106 over time to monitor the intensity of the signals and classify or characterize the signals as being indicative of the presence of a human or user proximate the electronic device 100, or not. An orientation range classifier module 322 similarly processes signals generated by the motion sensor 106 indicating the position or orientation of the electronic device 100 over time. The SPS module 308 thereafter also utilizes the classifications generated by the modules 318-322 to determine whether a user 112 is proximate the electronic device 100.

Finally, for the signals generated by the audio sensor or microphone 104, a sound intensity estimator module 324 processes the signals over time to estimate an intensity of the sound sensed by the microphone. A sound intensity trigger module 326 then determines whether the sensed intensity from the sound intensity estimator module 324 exceeds a sound intensity trigger threshold. When the sound intensity trigger threshold module 326 determines the sensed sound exceeds the sound intensity trigger threshold, a sound type classifier module 328 processes the signals generated by the microphone 104 over time to determine whether the signals are indicative of sounds generated by a human proximate the electronic device 100. The sound type classifier module 328 provides a determined classification of the sensed sound, namely as being generated by a human or not, to the SPS module 308 which, in turn, also utilizes this determined classification in determining whether a human is present proximate the electronic device 100.

Figure 4:
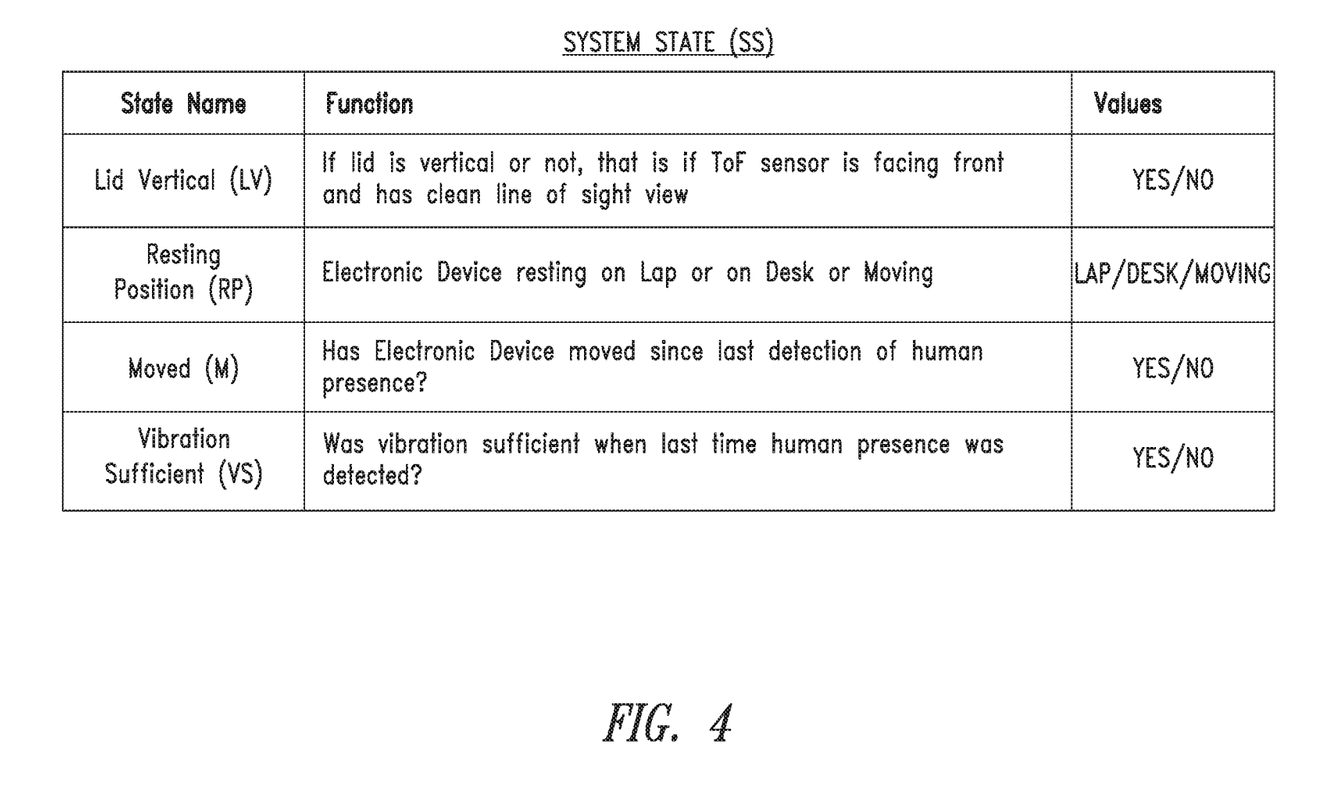
FIG. 4 is a table showing the system state parameters utilized by the sensor fusion algorithm of FIGS. 1 and 3 in processing the signals from the TOF, audio, and motion sensors to detect the presence of a user according to one embodiment of the present disclosure.

FIG. 4 is a table showing system state parameters SS utilized by the sensor fusion algorithm 108 of FIGS. 1 and 3 in processing the signals from the TOF sensor 102, audio sensor 104, and motion sensor 106 to detect the presence of a user according to one embodiment of the present disclosure. More specifically, the SPS module 308 of the sensor fusion algorithm 108 as shown in FIG. 3 utilizes current system state parameters SS of the electronic device 100 in combination with the classification determinations from the modules 306, 318-322 and 328 in determining whether a user is proximate the electronic device 100.

Recall, in the embodiment of the sensor fusion algorithm 108 being described, the electronic device 100 is assumed to be a laptop computer such as the laptop computer 200 of FIGS. 2A and 2B. In this embodiment, the first one of the system state parameters SS is a lid vertical parameter LV indicating whether the lid 202 of the laptop computer is vertical. The parameter LV has one of two values, a YES value indicating the lid 202 is open, or a NO value when the lid is not vertical, indicating the lid is closed or at least partially closed. The parameter LV thus indicates whether the TOF sensor 102 is forward facing, or namely has its field-of-view $FOV_{TOF}$ positioned so as to properly illuminate an object such as a human positioned in front of the laptop computer 200. The parameter LV may more generally be considered a TOF parameter in the system state parameters SS that indicates whether a distance to an object sensed by the TOF sensor 102 may be relied on to indicate distance to a user 112 of the electronic device 100. For example, if the electronic device 100 is a tablet computer instead of a laptop computer, and the tablet computer is positioned screen down on the lap of a user, the orientation of the TOF sensor 102 is such that the detected distance signal $DD_{TOF}$ generated by the TOF sensor cannot be relied upon to provide meaningful or reliable information about a user 112 proximate the electronic device 100 for controlling access to the electronic device.

A second system state parameter SS is a resting position RP parameter indicating whether the laptop computer 200 is positioned resting on a lap of a user, whether positioned on a desk or other stationary surface, or whether the laptop computer 200 is moving. A third system state SS parameter is a moved M parameter indicating whether the laptop computer 200 has moved since the last time the user was detected proximate the laptop computer, such as the last time the user logged in to the computer. Finally, a fourth system state SS parameter is a vibration sufficient VS parameter indicating whether, the last time the human was detected proximate the laptop computer 200, vibrations sensed by the motion sensor 106 were sufficient to reliably detect the presence of a human proximate the laptop computer. For example, if the user is using the laptop computer 200 in a carpeted room, the magnitude of vibrations sensed by motion sensor 106 may not reliably indicate a person or user approaching the laptop computer.

Figure 5:
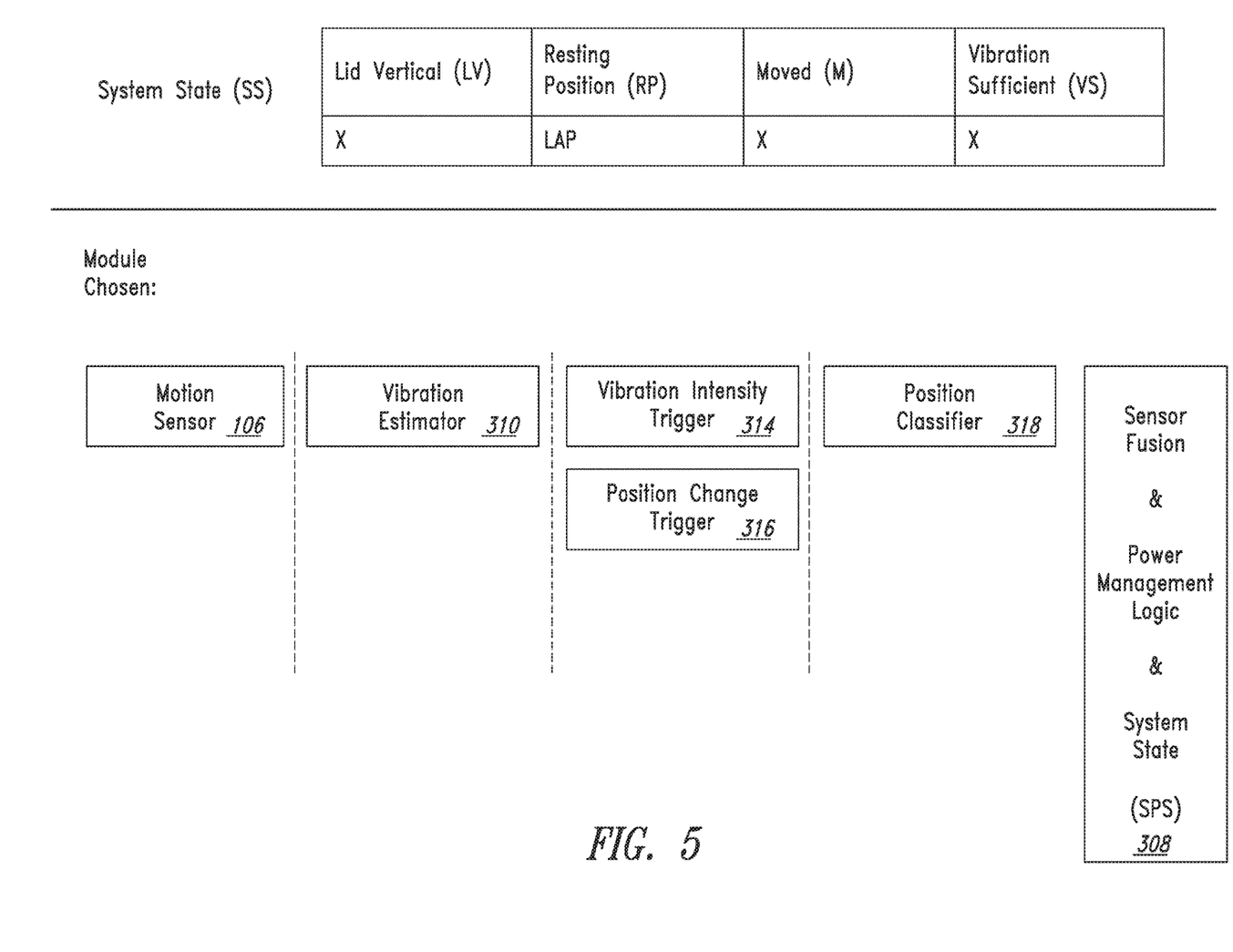
FIG. 5 is a functional diagram illustrating the operation of the sensor fusion algorithm of FIG. 3 when the system state indicates a laptop computer electronic device is positioned on the lap of a user.

FIG. 5 is a functional diagram illustrating the operation of the sensor fusion algorithm 108 of FIG. 3 when the system state parameters SS indicate the laptop computer 200 is positioned on the lap of a user. More specifically, FIG. 5 illustrates the operation of the SPS module 308 in processing the signals generated by the sensors 102-106 (FIGS. 1 and 2) and the system state parameters SS to determine whether a user is proximate the laptop computer 200 and to implement power management logic functionality of the SPS module, as will now be described in more detail. In the example of FIG. 5, the resting position RP parameter in the system state parameters SS of the laptop computer 200 indicates that the laptop computer is positioned on the lap of a user. In this situation, regardless of the values of the other parameters in the system state parameters SS of the laptop computer 200, a user or human is known to be proximate the laptop computer. The X's indicated for the moved parameter M, vibration sufficient parameter VS, and lid vertical parameter LV in the system state parameters SS indicate that the status or values of these parameters do not matter.

For the system state parameters SS of FIG. 5 (i.e., laptop computer 200 positioned on lap of a user), the SPS module 308 deactivates selected modules and sensors to eliminate unnecessary processing by these modules and sensors and thereby lower the power consumption of the sensor fusion algorithm 108 which, in turn, lowers the overall power consumption of the laptop computer 200. The sensor fusion algorithm 108 has a modular structure as shown in FIG. 3, where each of the modules has a different power consumption and complexity. The SPS module 308 utilizes the system state parameters SS in controlling activation and deactivation of the various modules that make up the sensor fusion algorithm 108. In this way, modules of the sensor fusion algorithm 108 and their associated sensors are deactivated to lower power consumption when the generation of signals by these sensors and the processing of such sensor signals are not necessary or useful in detecting the presence of a person or user 112 proximate the laptop computer 220 and the intent of such a person or user to access the laptop computer.

In the example of FIG. 5, where the system state parameters SS indicates the laptop computer 200 is positioned on the lap of user, the SPS module 308 in this situation processes the only the signals generated by the motion sensor 106 to determine whether the laptop computer remains positioned on the lap of the user such that a user is proximate the laptop computer 200. The SPS module 308 provides a result of this determination to the processor 110 (FIG. 1) which, in turn, takes appropriate action to control the laptop computer 200 based upon the detection of a user proximate the laptop computer. For example, as long as the laptop computer 200 remains positioned on the lap of a user, the processor 110 would typically continue to provide access to the computer absent the occurrence of some other factor, such as inactivity of the keyboard for a predetermined time.

In addition, the SPS module 308 deactivates selected sensors and modules of the sensor fusion algorithm 108 to lower the power consumption of the laptop computer 200 for the system state parameters SS of FIG. 5. More specifically, the SPS module 308 deactivates the modules 300-306 associated with the TOF sensor 102 and the modules 324-328 associated with the audio sensor 104. This is represented in FIG. 5 by omitting these deactivated modules 300-306 and 324-328 in the figure. With the modules 300-306 and 324-328 deactivated, the sensor fusion algorithm 108 corresponds to the active modules in the algorithm, which are those shown in FIG. 5. The processing of the sensor signals from the TOF and audio sensors 102, 104 is not necessary in this system state indicated by parameters SS of FIG. 5, namely where the laptop computer 200 is known to be positioned on the lap of a user, and deactivating these modules 300-306 and 324-328 lowers the power consumption of the computer. Since the modules 300-306 and 324-328 processing the signals from the TOF sensor 102 and audio sensor 104, respectively, are deactivated, the SPS module 308 or processor 110 also deactivates the TOF and audio sensors as well in this situation to further lower power consumption. This is also represented in FIG. 5 by the omission of these sensors 102, 104. Deactivating the sensors 102 and 104 means each of the sensors is placed in a mode of operation other than a normal operating mode but is not limited to simply turning OFF each of these sensors. The same is true for deactivating the motion sensor 106 in the discussion of some of the embodiments of the sensor fusion algorithm 108 discussed below.

In the system state of FIG. 5, the SPS module 308 also deactivates selected modules associated with processing signals generated by the motion sensor 106. More specifically, the orientation estimator module 312, motion intensity classifier module 320, and orientation range classifier module 322, which are associated with processing the signals generated by the motion sensor 106, are also deactivated for the system state parameters SS of FIG. 5. The orientation range estimator module 312 processes signals generated by the motion sensor 106 to determine an estimated orientation of the laptop computer 200, but where the laptop computer is indicated as positioned on the lap of a user 112 (RP=LAP) and the lid vertical parameter LV indicates the lid 202 (FIG. 2) of the laptop computer is vertical, the laptop computer may be assumed to be properly oriented on the lap the user. Thus, the orientation range estimator module 312 is deactivated in this situation.

The orientation range classifier module 322, which determines an orientation range of the laptop computer 200 and classifies the determined range, is also deactivated to conserve power. The motion intensity classifier module 322, which determines a class associated with a sensed intensity of the signals from the motion sensor 106, is similarly deactivated since presumably the only motion associated with the laptop computer 318 is that associated with identifying the computer as being positioned on the lap of the user 112 by the position classifier 318. Thus, the motion intensity module classifier 320 is also deactivated to lower power consumed by the executing the sensor fusion algorithm 108 and thereby lower the overall power consumption of the laptop computer 200.

Figure 6:
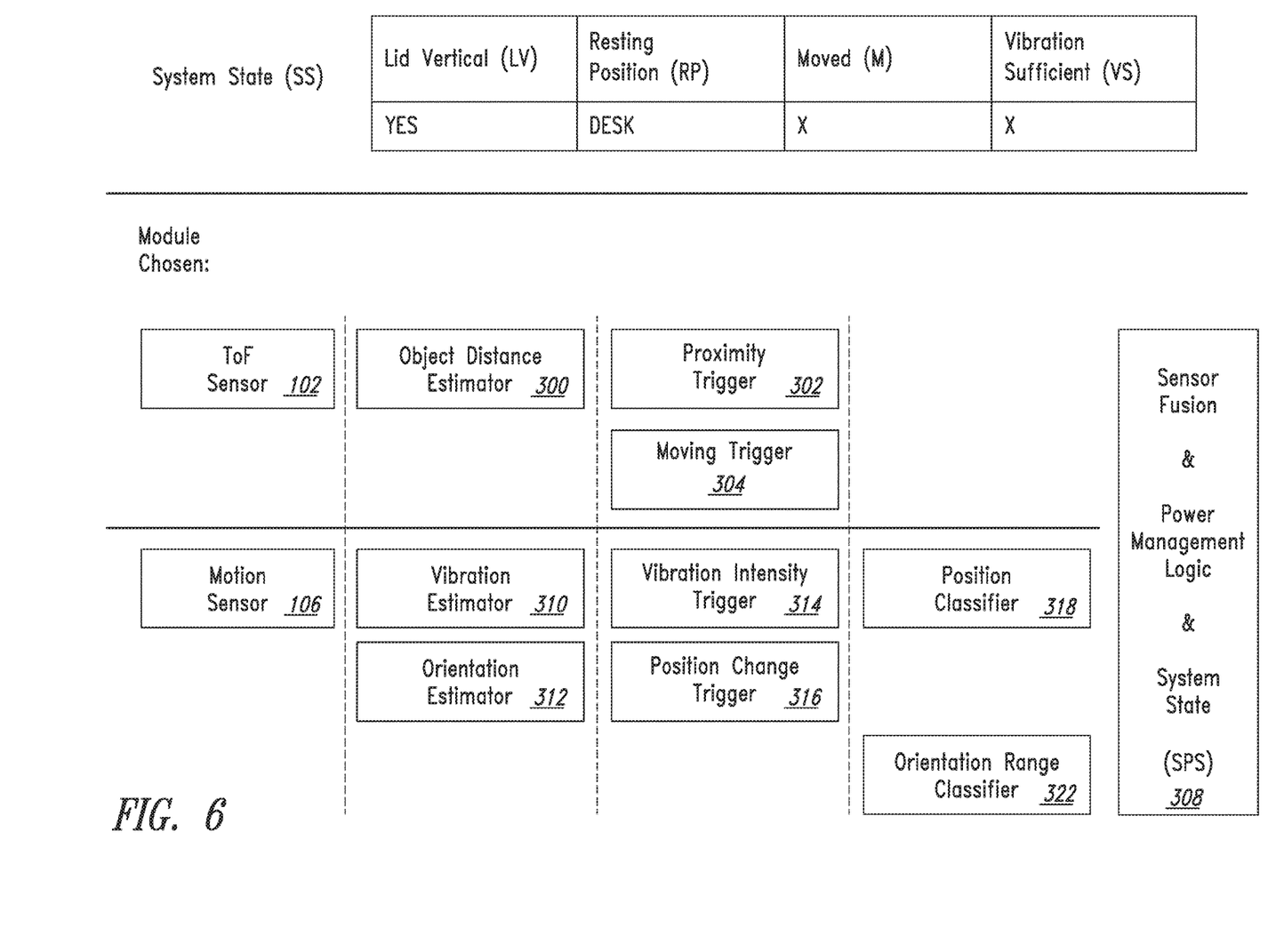
FIG. 6 is a functional diagram illustrating the operation of the sensor fusion algorithm of FIG. 3 when the system state indicates the laptop computer electronic device is positioned on a desk and a lid of the laptop computer is open or vertical.

FIG. 6 is a functional diagram illustrating the operation of the sensor fusion algorithm 108 of FIG. 3 when the system state parameters SS indicate the laptop computer 200 is positioned on a desk and a lid of the laptop computer is open or vertical. For these system state parameters SS, the lid vertical parameter LV has the YES value, which indicates the lid 202 of the laptop computer 200 is vertical and the TOF sensor 102 is accordingly properly oriented to detect the user 112 and other objects positioned proximate the laptop computer 200. The resting position RP parameter indicates the laptop computer 200 is positioned not on the lap of a user 112 but on a desk or other stationary surface. In the system state of FIG. 5, the values of the moved parameter M and the vibration sufficient parameter VS do not matter for determining this system state and these parameters are accordingly again indicated as X's.

In operation, for the system state parameters SS of FIG. 6, the SPS module 308 processes signals generated by the TOF sensor 102 and the motion sensor 106 in determining whether a user is proximate the laptop computer 200 and intends to interact with the computer. The SPS module 308 or processor 110 also deactivates the modules 324-328 associated with the microphone 104 along with the microphone itself to lower the power consumption of the laptop computer 200. The TOF sensor 102 is properly oriented to detect the user 112 and other objects positioned proximate the laptop computer 200 as previously mentioned. Thus, the modules 300-304 along with the SPS module 308 process over time the detected distance signal $DD_{TOF}$ from the TOF sensor 102, which indicates the detected distance $D_{TOF}$ to the user 112 or other objects, and the SPS algorithm 308 and processor 110 control the laptop computer 200 based on the processing of the detected distance signal.

For the system state parameters SS of FIG. 6, the object type classifier module 306, which as seen in FIG. 3 is associated with processing the signal generated by the TOF sensor 102, is also deactivated. The object type classifier module 306 determines a type of an object sensed by the TOF sensor 102, such as a human or an inanimate object like a wall or window. In the context of FIG. 6 as determined by the system state parameters SS, the laptop computer 200 is positioned on a desk with the lid 202 vertical and thus a sensed object may be assumed to be a human, making unnecessary classification of the type of sensed object by the object type classifier module 306. The module 306 is accordingly deactivated to reduce computational complexity and lower power consumption. In addition, the motion intensity classifier module 320 associated with processing the motion and vibrational signals generated by the motion sensor 106 is also deactivated for the system state parameters SS of FIG. 6. The motion intensity classifier 320 determines a class of an object generating motion and vibrational signals sensed by the motion sensor 106, but unless the position classifier 318 detects a change in position of the laptop computer 200 as no longer being positioned on a desk, as indicated by the resting position parameter RP, this classification by the motion intensity classifier is not necessary and is accordingly also deactivated to reduce computational complexity and lower power consumption.

Figure 7:
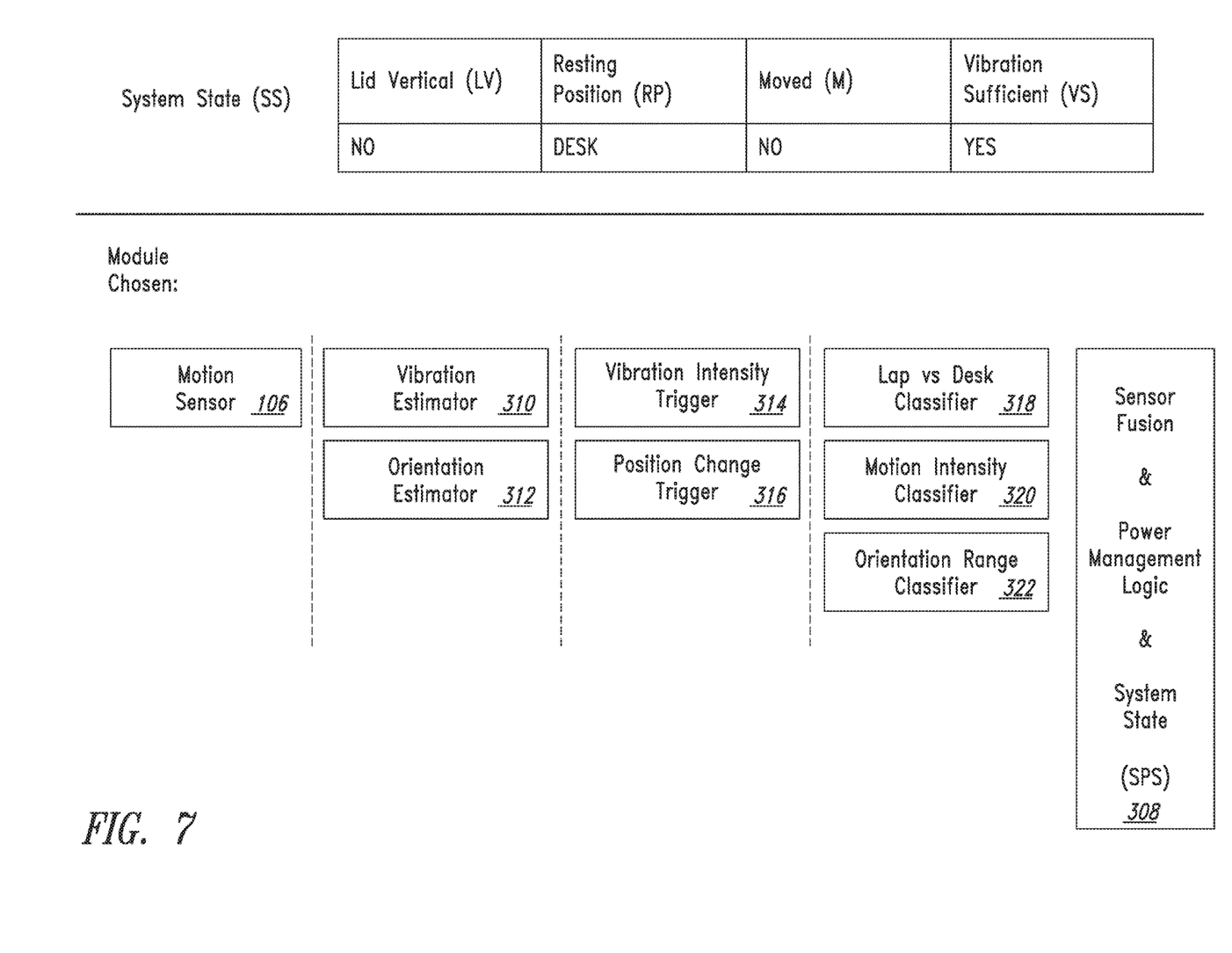
FIG. 7 is a functional diagram illustrating the operation of the sensor fusion algorithm of FIG. 3 when the system state indicates the laptop computer electronic device is positioned on a desk with the lid of the laptop computer closed or not vertical and vibrations sensed by the motion sensor having been sufficient to identify the presence of the user last time the user was detected.

FIG. 7 is a functional diagram illustrating the operation of the sensor fusion algorithm 108 of FIG. 3 when the system state parameters SS indicate the laptop computer 200 is positioned on a desk (RP=DESK) with the lid 202 of the laptop computer closed or not vertical, and where vibrations sensed by the motion sensor 106 were sufficient to identify the presence of the user 112 last time the user was detected. For the system state parameters SS illustrated in FIG. 7, the resting position parameter RP indicates the laptop computer 200 is positioned on a desk (RP=DESK) or other stationary surface, and has not moved since the last time a user 112 was detected proximate the laptop computer as indicated by the moved parameter M (M=NO). In addition, the vibrations sensed by the motion sensor 106 were sufficient to indicate the presence of a human or user 122 the last time the user was detected as indicated by the vibration sufficient parameter VS. Finally, the lid 202 of the laptop computer 200 is not vertical as indicated by the lid vertical parameter LV. Recall, these system state parameters SS that define the system state of the laptop computer 200 are stored by the SPS module 308.

For the system state parameters SS of FIG. 7, the SPS module 308 terminates execution of the modules 300-306 associated with the TOF sensor 102 and may deactivate the TOF sensor itself. This lid 202 is not vertical and thus the detected distance signal $DD_{TOF}$ may not be utilized to provide meaningful information so these components are accordingly terminated. The SPS module 308 similarly deactivates the modules 324-328 associated with the microphone 104, and may deactivate the microphone itself. The vibrations sensed by the motion sensor 106 were sufficient to identify the presence of the user 112 last time the user was detected and thus the audio signal generated by the audio sensor 104, which is a microphone in the preset example, need not be processed, so the microphone along with the associated modules 324-328 are deactivated.

The SPS module 308 processes the signals generated by the motion sensor 106 to detect the presence of a human proximate the laptop computer 200 and to sense any change in system state of the laptop computer, and controls the laptop computer accordingly. In this situation, the vibration detected by the motion sensor 106 the last time a human was properly detected proximate the laptop computer 200 was sufficient (VS=YES) and thus vibrations sensed by the motion sensor can again be utilized and are therefore processed by the modules 310-322 to identify the presence of a human proximate the laptop computer and change in system state of the laptop computer 200, with the SPS module 308 controlling the laptop computer accordingly.

Figure 8:
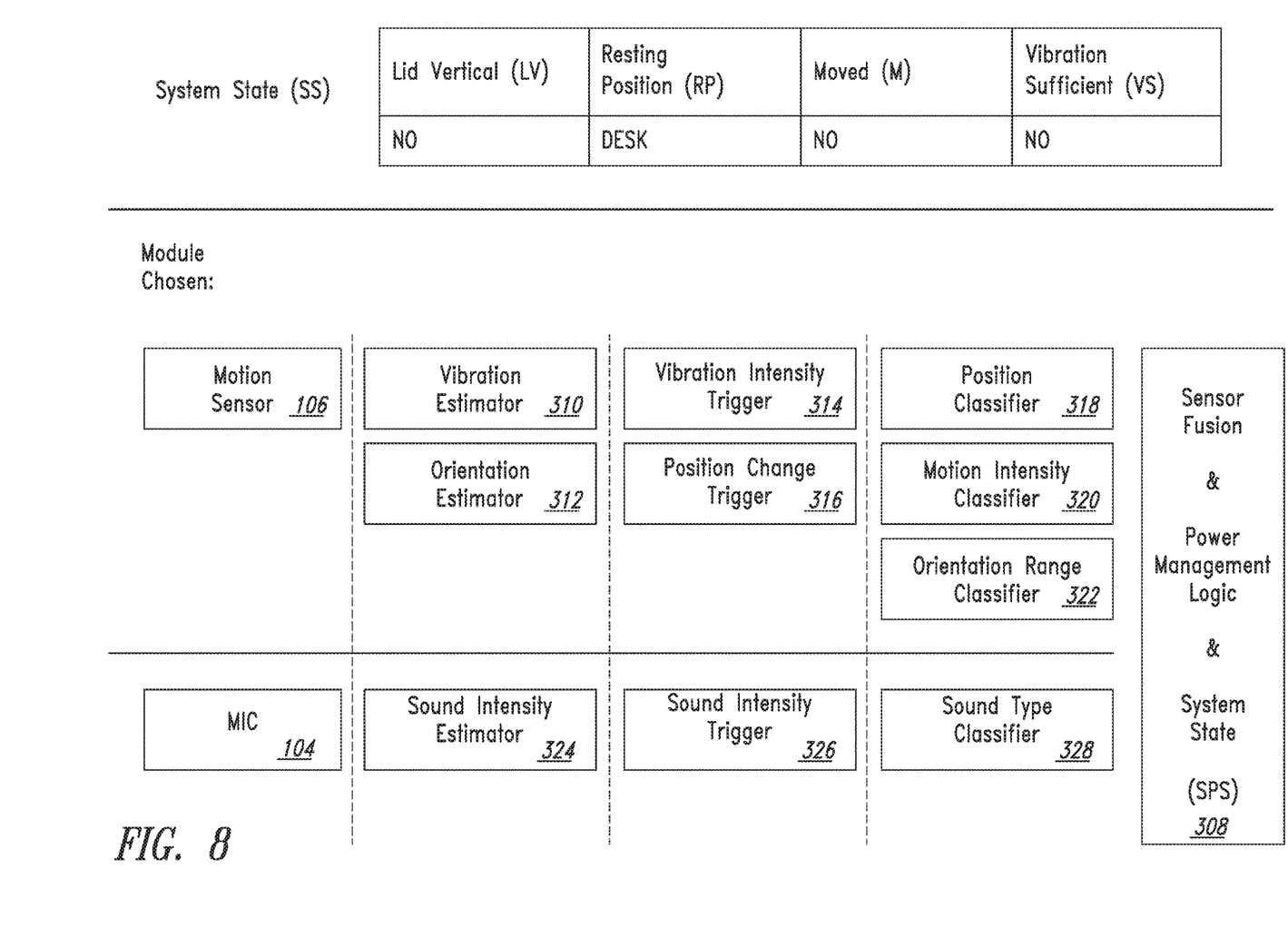
FIG. 8 is a functional diagram illustrating the operation of the sensor fusion algorithm of FIG. 3 when the system state indicates the laptop computer electronic device is positioned on a desk with the lid of the laptop computer closed or not vertical and vibrations sensed by the motion sensor not having been sufficient to identify the presence of the user last time the user was detected.

FIG. 8 is a functional diagram illustrating the operation of the sensor fusion algorithm 108 of FIG. 3 when the system state parameters SS indicate the laptop computer 200 is positioned on a desk with the lid of the laptop computer closed or not vertical and vibrations sensed by the motion sensor not having been sufficient to identify the presence of the user last time the user was detected. The system state of FIG. 8 is the same as that of FIG. 7 except for the value of the vibration sufficient parameter VS (VS=NO in FIG. 8). This means the signals generated by the motion sensor 106 alone cannot be utilized by the SPS module 308 so the audio sensor 104 and associated modules 324-328 are also activated, as will now be discussed in more detail.

For the system state parameters SS of FIG. 8, the processing associated with the TOF sensor 102 is deactivated since the lid vertical parameter LV (LV=NO) indicates the lid 202 of the laptop computer 200 is closed. The vibration sufficient parameter VS indicates last time the user 112 was detected proximate the laptop computer 200 the signals generated by the motion sensor 106 were not sufficient (VS=NO) to properly identify the user. The moved parameter M=NO indicates the laptop computer 200 has not moved since the last time the user 112 was properly detected proximate the laptop computer 200, and the resting parameter RP=DESK indicates the computer is present on a desk.

In system state of FIG. 8, the signals generated by the motion sensor 106 and audio sensor 104 are used to identify the presence of user proximate the laptop computer 200 and any change in system state of the laptop computer. Thus, the SPS module 308 processes the signals generated by the modules 310-322 associated with the motion sensor 106 and the audio signal generated by the microphone 104 to identify a user proximate the laptop computer 200 and to detect any change in system state of the computer, and to control the computer accordingly.

Figure 9:
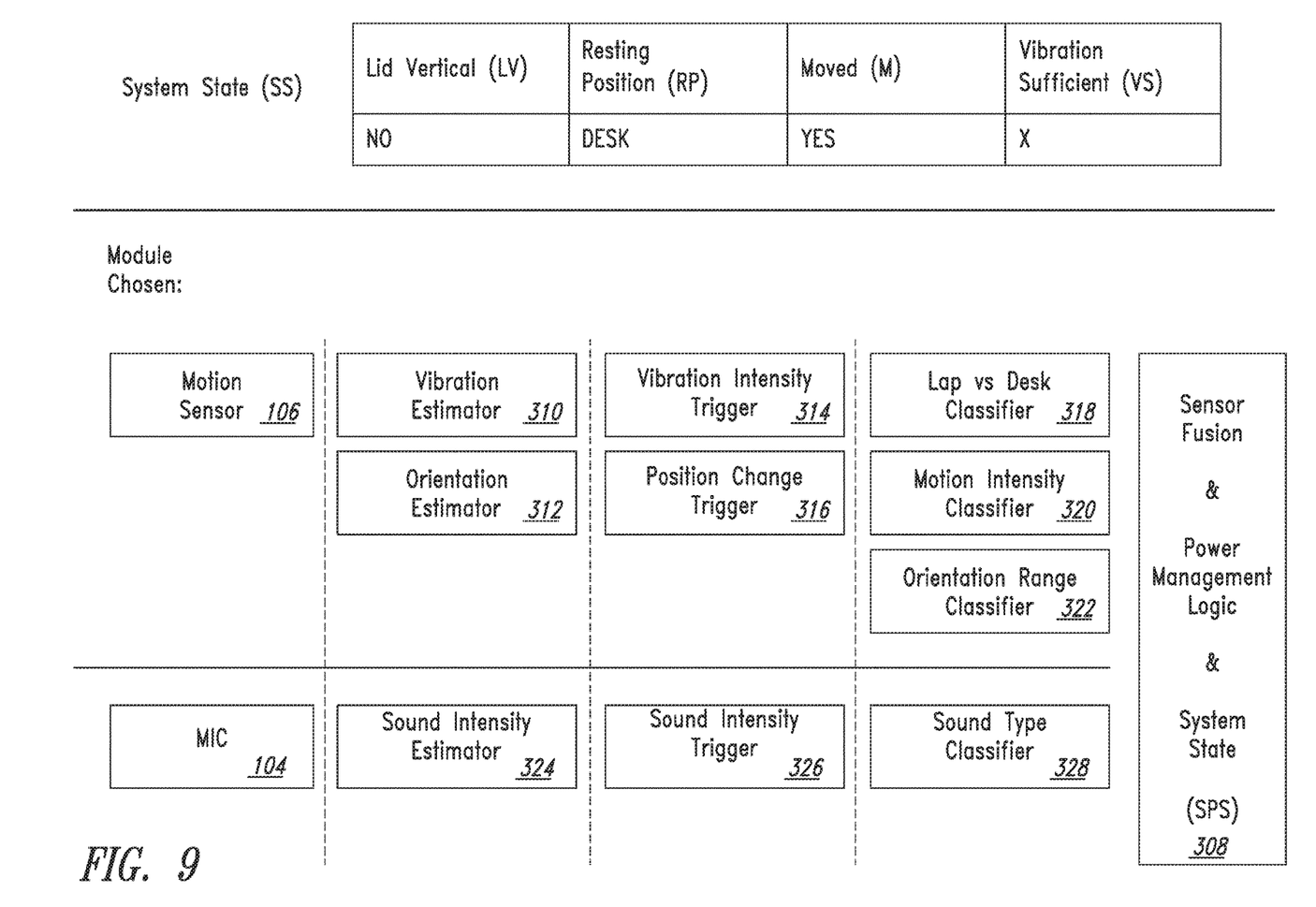
FIG. 9 is a functional diagram illustrating the operation of the sensor fusion algorithm of FIG. 3 when the system state indicates the laptop computer electronic device is positioned on a desk with the lid of the laptop computer closed or not vertical and the laptop computer having been moved since the last time the user was detected.

FIG. 9 is a functional diagram illustrating the operation of the sensor fusion algorithm 108 of FIG. 3 when the system state parameters SS indicate the laptop computer 200 is positioned on a desk (RP=DESK) with the lid 202 of the laptop computer closed or not vertical (LV=NO) and the laptop computer having been moved since the last time the user 112 was detected. For the system state parameters SS of FIG. 9, the processing modules 300-306 associated with the TOF sensor 102, and the TOF sensor itself, are deactivated since the lid vertical LV parameter indicates the lid 202 of the laptop computer 200 is closed. The vibration sufficient parameter VS (VS=X) does not matter in the system state of FIG. 9 because the moved parameter M=YES indicates the laptop computer 200 has moved since the last time a user 112 was properly detected proximate the laptop computer, as will be discussed in more detail below. The resting parameter RP=DESK again indicates the computer 200 is present on a desk or other hard, flat surface. In this system state, the signals generated by the motion sensor 106 and microphone 104 are processed by the associated modules 310-322 and 324-328 and the SPS module 308 to a user 112 proximate the computer 200 and any change in the system state of the computer and to control the computer accordingly.

In FIG. 9, the moved parameter M=YES indicates the laptop computer 200 has moved since the last time the user 112 was detected proximate the laptop computer. As a result, regardless of whether the motion sensor 106 was able to properly identify a user 112 proximate the laptop computer 200 last time the user was properly identified, additional information provided by the signals generated by the microphone 104 are in this situation utilized because the current position of the laptop computer is unknown. The laptop computer 200 was previously resting on a desk or other stationary and presumably hard surface where vibrations sensed by the motion sensor 106 may more reliably sense the presence of a user proximate the laptop computer. Because the computer 200 has been moved, however, the computer may now be in a different resting position on a different type of surface such that the vibrations sensed by the motion sensor 106 may no longer be sufficient to properly identify a user proximate the laptop computer. Thus, regardless of whether the vibration signals from the motion sensor 106 were previously sufficient, the SPS module 308 can no longer relay on the vibration sufficient parameter VS. Both the motion signals generated by the motion sensor 106 and audio signals generated by the microphone 104 are accordingly processed by the modules 310-322 and 324-328, and the SPS module 308 determines from these processed signals whether a user is proximate the laptop computer 200 with an intent to interact with the computer and a change in system state of the computer, and controls the laptop computer accordingly.

Referring back to the embodiment of the electronic device 100 of FIG. 1, each of the sensors 102, 104 and 106 is connected to the processor 110 that executes the sensor fusion algorithm 108. All modules of the sensor fusion algorithm 108 execute on the processor 110 in this embodiment, with the sensors 102-106 sensing the respective types of data and communicating this date to the processor for use by the sensor fusion algorithm. The system state parameters SS are determined and updated by the sensor fusion algorithm 108 at the processor level since the entire sensor fusion algorithm executes on the processor 110.

In another embodiment, each of the sensors 102-106 includes circuitry for executing associated sensor-specific algorithms of the sensor fusion algorithm 108. All the sensors 102-106 in this embodiment perform these sensor-specific algorithms, either in hardware, software, or a combination of both, in the sensor itself. Each sensor 102-106 accordingly senses the corresponding type of data, executes on this sensed data the associated modules of the sensor fusion algorithm 108 to generate processed signal data, and then communicates this processed signal data to the processor 110. The processor 110 executes the SPS module 308, which also maintains the system state parameters SS on the processor or at the processor level. For example, in this embodiment the TOF sensor 102 generates the detected distance signal $DD_{TOF}$ as previously described, and also processes this detected distance signal by executing the object distance estimator module 300, proximity trigger and moving trigger modules 302, 304, and the object type classifier module 306. This processed information is generated by these modules 300-306 executing in the TOF sensor 102, with processed data generated by the object classifier module 306 then being communicated to the processor 110 for use by the SPA algorithm 308 executing on the processor. Only the fusion, power management, and system state logic executed by the SPA module 308 are executed on processor 110 in this embodiment. The same is true for the motion sensor 106, namely the modules 310-322 execute on circuitry in the motion sensor itself and processed data generated by the modules 318-322 then being communicated to the processor 110 for use by the SPA algorithm 308. Similarly, the audio sensor 103 contains circuitry that includes the modules 324-328 and the processed data from the module 328 is communicated to the processor 110 for use by the SPA module 308.

In another embodiment, the modules of sensor fusion algorithm 108 are distributed among the sensors 102-106 and the processor 110. For example, in such an embodiment the classifier modules 306, 318-322 and 328 along with the SPA module 308 are executed on the processor 110 while the remaining modules of the sensor fusion algorithm are executed on the respective sensors. Thus, in this embodiment the TOF sensor 102 would include the modules 300-304, motion sensor 106 would include the modules 310-316 and audio sensor 104 would include the modules 324 and 326. The trigger modules 302, 304, 314, 316 and 326 would then communicate processed data to the processor 110 for use by the classifier modules 306, 318-322 and 328. The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
sensing through time-of-flight measurements a distance of an object from an electronic device;
sensing motion of the electronic device;
sensing acoustic signals received by the electronic device;
detecting presence of a human proximate the electronic device based on the sensed distance, motion and acoustic signals;
determining a plurality of system states of the electronic device based on the sensed distance and motion, the plurality of system states including:
a lid vertical state indicating whether a lid of the electronic device is vertical,
a resting position state indicating whether the electronic device is resting on a lap,
a moved state indicating whether a position of the electronic device has moved since last detection of human presence, and
a vibration state indicating a reliability of sensed vibration data the last time human presence was detected; and
controlling access to the electronic device based on the determined system states.

2. The method of claim 1 further comprising controlling access to the electronic device based on detecting the presence of a human proximate the electronic device.

3. The method of claim 1 further comprising processing one or more of the sensed distance, motion and acoustic signals based on the system state.

4. The method of claim 3 further comprising providing or denying access to the electronic device based on the determined system state and the processing of the one or more of the sensed distance, motion and audio signals.

5. The method of claim 4, wherein sensing motion of the electronic device includes sensing vibration signals received by the electronic device, and wherein determining the system state comprises:
determining whether the time-of-flight measurements sensing the distance of the object are reliable measurements.

6. The method of claim 1, wherein sensing through time-of-flight measurements the distance of the object from the electronic device includes determining whether the object is a human [or an inanimate object based on whether the object is moving relative to the electronic device].

7. The method of claim 1, wherein sensing acoustic signals received by the electronic device comprises processing the sensed acoustic signals to detect at least one of human walking or human talking proximate the electronic device.

8. An electronic device, comprising:
a time-of-flight sensor that in operation generates a distance signal indicating a distance of an object from the electronic device;
a motion sensor that in operation generates a motion signal indicating motion of the electronic device;
an audio sensor that in operation generates a sensed audio signal in response to acoustic signals received by the electronic device; and
a processor coupled to the time-of-flight, motion and audio sensors that in operation processes the distance, motion, and sensed audio signals and controls access to the electronic device based on the processed distance, motion and sensed audio signals,
wherein the processor is configured to determine a plurality of system states of the electronic device based on the distance signal and the motion signal, the plurality of system states including:
a lid vertical state indicating whether a lid of the electronic device is vertical,
a resting position state indicating whether the electronic device is resting on a lap,
a moved state indicating whether a position of the electronic device has moved since last detection of human presence, and
a vibration state indicating a reliability of sensed vibration data the last time human presence was detected.

9. The electronic device of claim 8, wherein the processor comprises a plurality of modules configured to process the distance, motion, and audio signals.

10. The electronic device of claim 9, wherein the processor in operation activates and deactivates selected ones of the plurality of modules based on the determined system state.

11. The electronic device of claim 10, wherein the motion sensor comprises an accelerometer and a gyroscope that in operation sense vibrations received by the electronic device, sense movement of the electronic device, and sense an orientation of the electronic device.

12. The electronic device of claim 8, wherein the system state comprises a TOF state indicating whether the distance signal from the time-of-flight sensor should be processed to control access to the electronic device.

13. The electronic device of claim 8, wherein the electronic device comprises a laptop computer having the lid and a base, and the time-of-flight sensor is positioned in the lid of the laptop computer, and wherein the lid vertical states indicate whether the lid of the laptop is vertical relative to the base to properly orient the time-of-flight sensor.

14. The electronic device of claim 8, wherein the processor includes:
a sound intensity estimator module configured to estimate an intensity of sound sensed by the audio sensor;
a sound intensity trigger module configured to determine whether the estimated sound intensity exceeds a sound intensity trigger threshold; and
a sound type classifier module configured to process the sensed audio signal, in response to the estimated sound intensity exceeding the sound intensity trigger threshold, and to classify the sensed audio signal as being generated by a human or not.

15. An electronic device, comprising:
a time-of-flight sensor configured to sense a distance of an object from the electronic device and to generate a distance signal indicating the sensed distance;
a motion sensor configured to generate a motion signal indicating motion of the electronic device;
an audio sensor configured to sense acoustic signals incident on the electronic device and to generate a sensed audio signal based on the acoustic signals; and
a processor coupled to the time-of-flight, motion and audio sensors, the processor including a plurality of modules configured to process the distance, motion, and audio signals to detect whether a user is proximate the electronic device and to determine a plurality of system states indicating current and prior operating conditions of the electronic device, the processor further configured to control access to the electronic device based upon the determined system states and whether the user is detected proximate the electronic device,
wherein the plurality of system states includes:
a lid vertical state indicating whether a lid of the electronic device is vertical,
a resting position state indicating whether the electronic device is resting on a lap,
a moved state indicating whether a position of the electronic device has moved since last detection of human presence, and
a vibration state indicating a reliability of sensed vibration data the last time human presence was detected.

16. The electronic device of claim 15, wherein the processor is further configured to selectively activate and deactivate ones of the plurality of modules based on the determined system state.

17. The electronic device of claim 15, wherein the motion sensor comprises at least one accelerometer and at least one gyroscope.

18. The electronic device of claim 15, wherein the audio sensor comprises a microphone.

19. The electronic device of claim 15, wherein the electronic device comprises a laptop computer including the lid and a base, and wherein the time-of-flight sensor is contained in the lid and each of the motion sensor and audio sensor is contained in the lid or the base of the laptop computer.

20. The electronic device of claim 15, wherein the processor includes:
a sound intensity estimator module configured to estimate an intensity of sound sensed by the audio sensor;
a sound intensity trigger module configured to determine whether the estimated sound intensity exceeds a sound intensity trigger threshold; and
a sound type classifier module configured to process the sensed audio signal, in response to the estimated sound intensity exceeding the sound intensity trigger threshold, and to classify the sensed audio signal as being generated by a human or not.

* * * * *

UNITED STATES PATENT AND TRADEMARK OFFICE
CERTIFICATE OF CORRECTION

| | | |
|---|---|---|
| PATENT NO. | : 11,030,289 B2 | Page 1 of 1 |
| APPLICATION NO. | : 16/050628 | |
| DATED | : June 8, 2021 | |
| INVENTOR(S) | : Xiaoyong Yang et al. | |

It is certified that error appears in the above-identified patent and that said Letters Patent is hereby corrected as shown below:

In the Claims

<u>Column 15, Lines 64-65, Claim 6:</u>
"object is a human or an inanimate object based on whether the object is moving relative to the electronic device" should read, --object is a human.--.

Signed and Sealed this
Fourteenth Day of September, 2021

Drew Hirshfeld
*Performing the Functions and Duties of the*
*Under Secretary of Commerce for Intellectual Property and*
*Director of the United States Patent and Trademark Office*